United States Patent [19]

Foos

[11] Patent Number: 4,499,161
[45] Date of Patent: Feb. 12, 1985

[54] ELECTROCHEMICAL CELL USING DIMETHOXYMETHANE AND/OR TRIMETHOXYMETHANE AS SOLVENT FOR ELECTROLYTE

[75] Inventor: Joseph S. Foos, Waltham, Mass.

[73] Assignee: EIC Laboratories, Inc., Norwood, Mass.

[21] Appl. No.: 488,358

[22] Filed: Apr. 25, 1983

[51] Int. Cl.³ .............................................. H01M 6/14
[52] U.S. Cl. ..................................... 429/196; 429/194; 429/197
[58] Field of Search .................... 429/194, 196, 197

[56] References Cited

U.S. PATENT DOCUMENTS

| | | | |
|---|---|---|---|
| 3,542,602 | 11/1970 | Gabano | 136/155 |
| 3,578,500 | 5/1971 | Maricle et al. | 136/6 |
| 3,701,688 | 10/1972 | Gabano et al. | 429/194 |
| 4,060,674 | 11/1977 | Klemann et al. | 429/194 |
| 4,086,403 | 4/1978 | Whittingham | 429/194 |
| 4,118,550 | 10/1978 | Koch | 429/194 |
| 4,163,829 | 8/1979 | Kronenberg | 429/194 |
| 4,228,227 | 10/1980 | Saathoff et al. | 429/194 |
| 4,252,876 | 2/1981 | Koch | 429/197 |

Primary Examiner—Brian E. Hearn
Assistant Examiner—Stephen J. Kalafut

[57] ABSTRACT

Rechargeable electrochemical cell including a lithium-containing electrode and an electrolyte, the electrolyte including a lithium salt; a solvent for the lithium salt comprising a polymethoxy ether having the formula $$(CH_3O)_nCR_p$$

wherein n is 2 or 3, p is 2 when n is 2 and 1 when n is 3, and R is hydrogen or an alkyl group containing between one and four carbon atoms, inclusive, provided that, when p is 2, one R can be the same as or different from the other R; and an organic cosolvent comprising between 0 and 95% of the electrolyte, by volume, the polymethoxy ether being present in the electrolyte in an amount sufficient to render the cycling efficiency of the electrolyte greater than the cycling efficiency of an electrolyte consisting of the lithium salt and the cosolvent.

9 Claims, 2 Drawing Figures ced through a column of
ELECTROCHEMICAL CELL USING DIMETHOXYMETHANE AND/OR TRIMETHOXYMETHANE AS SOLVENT FOR ELECTROLYTE The Government of the U.S. has rights in this invention pursuant to Contract N00014-77-C-0155 awarded by the Department of the Navy.

FIELD OF THE INVENTION

This invention relates to non-aqueous electrolytes for electrochemical cells employing lithium-containing electrodes.

BACKGROUND OF THE INVENTION

In a secondary battery employing a lithium anode it is desirable to employ an electrolyte system which provides high cycling efficiency, good conductivity, and reasonable cost. The number of times a lithium battery can be recharged, and the efficiency of each recharging are the measures of cycling efficiency. Cycling efficiency of the Li electrode is primarily a function of the ability of the electrolyte solvent to withstand reduction by lithium, which is a powerful reducing agent. When reduction occurs, reaction products form on the surface of the lithium electrode preventing subsequent smooth replating during the recharge cycle. This results in dendritic growth and consequently poor lithium morphology.

Various ethers have been used in combination with lithium salts and rechargeable electrochemical cells. U.S. Pat. No. 4,060,674 describes "electrolyte compositions for reversible alkali metals cells, e.g. lithium batteries ... which consist of ... ethers ... and ... alkali metal salts." Among the types of ethers mentioned is "orthoesters." U.S. Pat. No. 3,578,500 describes "primary or secondary electrochemical cells" having "preferred active anode materials such as lithium and sodium." A list of solvents includes 2,2-dimethoxypropane and trimethylorthoformate, and a list of salts includes "lithium hexofluoroarsenates." Other combinations include dioxolane/LiClO$_4$, U.S. Pat. No. 4,086,403; tetrahydrofuran (THF)/LiAsF$_6$, U.S. Pat. No. 4,228,227; 2-methyltetrahydrofuran (2MeTHF)/LiAsF$_6$, U.S. Pat. No. 4,118,550; and diethyl ether (DEE) mixtures with cosolvents/LiAsF$_6$, U.S. Pat. No. 4,252,876.

SUMMARY OF THE INVENTION

My invention provides an electrolyte which is relatively inexpensive and which demonstrates good conductivity, high cycling efficiency, and good stability (low lithium reactivity).

In general, the invention features a rechargeable electrochemical cell including a lithium-containing electrode and an electrolyte, the electrolyte including a lithium salt; a solvent for the lithium salt comprising a polymethoxy ether having the formula $$(CH_3O)_nCR_p$$

wherein n is 2 or 3, p is 2 when n is 2 and 1 when n is 3, and R is hydrogen or an alkyl group containing between one and four carbon atoms, inclusive, provided that, when p is 2, one R can be the same as or different from the other R; and an organic cosolvent comprising between 0 and 95% of the electrolyte, by volume, the polymethoxy ether being present in the electrolyte in an amount sufficient to render the cycling efficiency of the electrolyte greater than the cycling efficiency of an electrolyte consisting of the lithium salt and the cosolvent.

In preferred embodiments the polymethoxy ether is dimethoxymethane or trimethoxymethane or a mixture of those two or of two or more other polymethoxy ethers; the cosolvent is an ether; and the lithium salt is LiAsF$_6$ or, less preferably, LiBF$_4$, LiSbF$_6$, LiPF$_6$, or LiClO$_4$. Preferably the electrolyte comprises at least 50% polymethoxy ether, by volume, more preferably at least 90%, by volume, and most preferably is essentially free of cosolvent.

The rechargeable electrochemical cells of the invention provide good conductivity, particularly at and below room temperature, and high cycling efficiency at high current densities.

Other features and advantages of the invention will be apparent from the following description of the preferred embodiments, and from the claims.

DESCRIPTION OF THE PREFERRED EMBODIMENTS

We turn now to the description of preferred embodiments, after first briefly describing the drawings.

DRAWINGS

EMBODIMENTS

Figure 1:
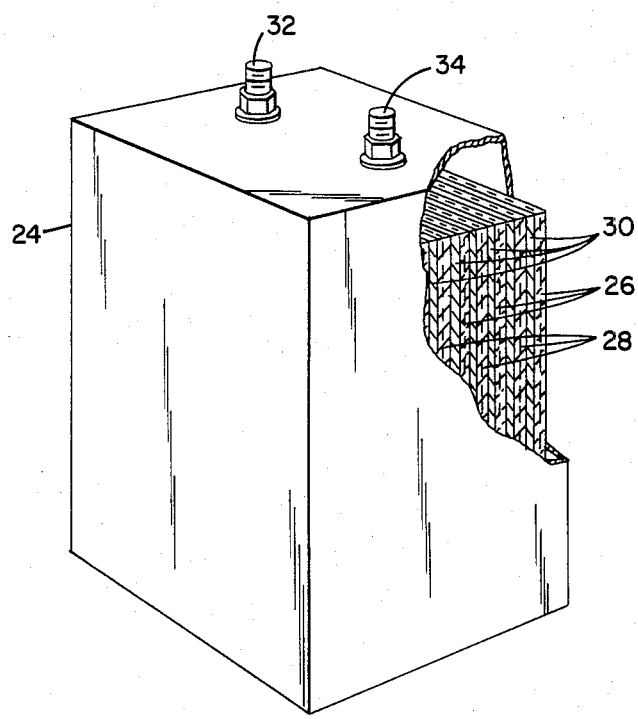
FIG. 1 is a schematic representation of a rechargeable battery employable with the subject electrolyte.

There is shown in FIG. 1 a schematic representation of an example of a rechargeable electrochemical cell which could be used in conjunction with the subject electrolyte. The illustrated battery comprises a sealed battery case 24 within which is disposed a plurality of flat negative elctrodes 26 consisting of essentially pure lithium deposited on nickel substrates, a plurality of flat positive electrodes 28 consisting of titanium disulfide deposited on expanded nickel, and a plurality of separators 30 in the form of flat porous mats made of microporous polypropylene film (Celgard) or glass fibers. The positive and negative electrodes are arranged alternatively with one another and a separator is disposed between each pair of positive and negative electrodes. The positive electrodes of the several cells are electrically coupled in parallel to a positive terminal 32 by suitable electrical conductors (not shown) in accordance with conventional battery fabrication technology, and the negative electrodes of the several cells are similarly connected to a negative battery terminal 24. The subject electrolyte surrounds the electrodes and separators and fills the interstices of the separators.

Electrolytes are prepared by adding purified LiAsF$_6$ to anhydrous solvent which has previously been, and continues to be, cooled. The solvent is dried either by adding an anhydrous salt which forms an insoluble hydrate or through the use of molecular sieves (3A or 4A). This is followed by formation of a blue solution in the ether from the reaction of Na metal and benzophenone. The ether is then distilled from the blue solution, which insures freedom from oxygen and water. In some cases the solvent is then percolated through a column of activated alumina. In some cases a subsequent pre-electrolysis treatment can be done. The pre-electrolysis consists of passing a small current between two Li electrodes immersed in the solution. Typically this is done overnight with stirring. Alternatively the electrolytes may be prepared and purified by other techniques which will be obvious to those skilled in the art.

The advantages of this invention are best illustrated by the results of cycling efficiency tests in half cells and Li/TiS$_2$ cells. The advantages are also illustrated by stability tests in the presence of Li and by conductivity tests.

Cycling efficiency tests simulate charge and discharge of a rechargeable Li electrode in a practical Li secondary battery. The Li cycling was done in prismatic glass cells containing 15–20 ml electrolyte. These tests involve making a pre-plate of 4.5 C/cm$^2$ of Li on a Ni substrate followed by stripping and then replating 1.1 C/cm$^2$ on the pre-plated Li. The average efficiency per cycle, E, is calculated according to Equation (1):

$$E = \frac{Q_s - \frac{Q_{ex}}{n}}{Q_s} \qquad (1)$$

where n is the number of apparent "100%" cycles, $Q_s$ is the charge stripped (1.1 C/cm$^2$), and $Q_{ex}$ is the charge eqivalent to excess Li (3.4 C/cm$^2$) at the start of the experiment. If the cell were truly 100% efficient, the 3.4 C/cm$^2$ excess Li would remain undisturbed. However, every apparent "100%" cycle depletes this reserve by an amount equal to the actual inefficiency of the cycle. Therefore, the number of apparent "100%" cycles is a function of the Li cycling efficiency as described above.

The results of half-cell cycling using 1.5M LiAsF$_6$ in DMM and 1.0M LiASF$_6$ and TMM are shown in Table 1. It is observed that high cycling efficiencies are achieved.

TABLE 1

HALF-CELL CYCLING TESTS USING DMM AND TMM SOLUTIONS

| Electrolyte | | Cycling Efficiency |
|---|---|---|
| DMM | (distilled) | 97.3% |
| | (distilled and alumina treated) | 97.5% |
| | (distilled and pre-electrolyzed) | 96.5% |
| TMM | (distilled) | 93.2% |
| | (distilled and pre-electrolyzed) | 95.1% |

To further illustrate the advantages of the subject electrolyte, Li/TiS$_2$ laboratory test cells were cycled. These test cells are comprised of Li metal on a nickel substrate, a positive electrode consisting of TiS$_2$ on expanded Ni, and separators of microporous polypropylene film surrounded by the subject electrolyte. The test cell is essentially one cell of the battery illustrated in FIG. 1. The test cell has been used to evaluate other electrolytes and is described in an article by K. M. Abraham et al. in the Journal of the Electrochemical Society, 129, 2404 (1982). A summary of the cycling results in shown in Table 2.

TABLE 2

SUMMARY OF Li CYCLING EFFICIENCIES IN Li/TiS$_2$ LABORATORY CELLS AT 1 mA/cm$^2$ WITH 25 C/cm$^2$ Li CHARGE DENSITY

| Electrolyte Solution | Average Li Cycling Efficiency (%) |
|---|---|
| 1.5 M LiAsF$_6$/DMM (distilled and alumina treated) | 86.1 |
| 1.5 M LiAsF$_46$DMM (distilled and pre-electrolyzed) | 91.0 |

TABLE 2-continued

SUMMARY OF Li CYCLING EFFICIENCIES IN Li/TiS$_2$ LABORATORY CELLS AT 1 mA/cm$^2$ WITH 25 C/cm$^2$ Li CHARGE DENSITY

| Electrolyte Solution | Average Li Cycling Efficiency (%) |
|---|---|
| 1.0 M LiAsF$_6$/TMM (distilled and pre-electrolyzed) | 84.2 |

Further evidence for the stability towards Li of LiAsF$_6$ electrolytes incorporating DMM and TMM is provided by stability tests at 70° C. Samples of the electrolytes were placed in sealed vials in the presence of Li metal. These were stored in an oven at 70° C. Little or no reaction was observed after one month at 70° C.

In order for an electrolyte to be useful in a practical rechargeable electrochemical cell, the specific conductivity of the electrolyte must be sufficient to provide adequate current flow without excessive voltage drop and energy loss due to heat. The subject electrolytes are relatively conductive as compared to others capable of cycling Li with high efficiency.

The conductivities of electrolytes containing LiAsF$_6$ are generally higher than those of electrolytes containing other salts such as LiClO$_4$ and LiBF$_4$; for this reason, LiAsF$_6$ is the preferred salt.

Figure 2:
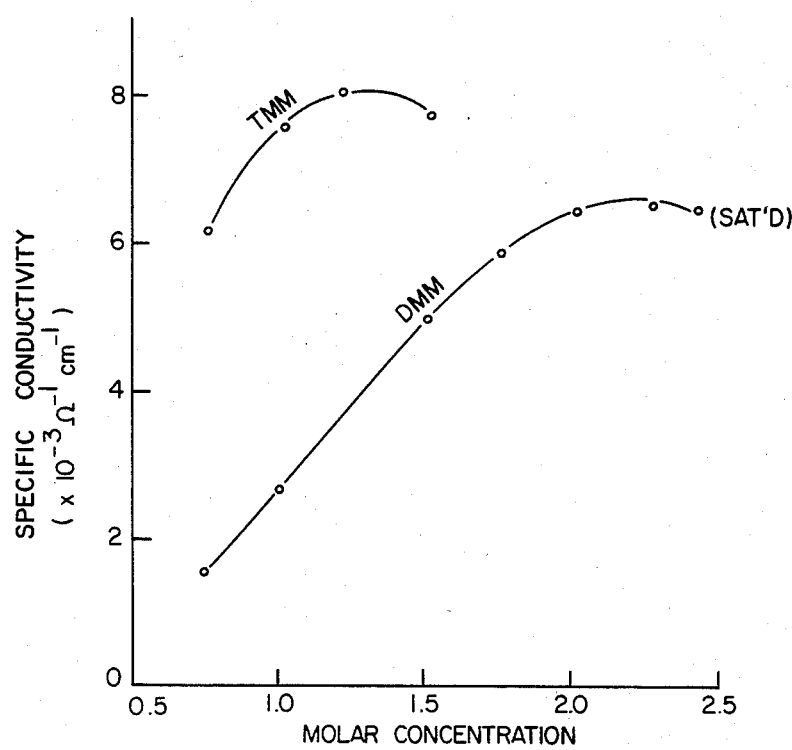
FIG. 2 is a graph of the relation between conductivity and LiAsF$_6$ concentration in a cell employing dimethoxymethane (DMM) and trimethoxymethane (TMM).

Conductivity vs. concentration profiles for LiAsF$_6$ in DMM and TMM are shown in FIG. 2. The conductivity profiles show maximum conductivities of approximately 0.0065 $\Omega^{-1}$ cm$^{-1}$ for DMM and 0.008 $\Omega^{-1}$ cm$^{-1}$ for TMM. Other subject electrolytes have conductivities similar to these, e.g., LiAsF$_6$ in 1,1-dimethoxyethane or 1,1,1-trimethoxyethane.

As mentioned above, the electrolyte can contain one or more organic cosolvents. Straight chain ethers, cyclical ethers, and polyethers are examples of effective cosolvents. Specific examples of such cosolvents include tetrahydrofuran, diethylether, 1,3-dioxolane, their alkyl-substituted derivatives, 1,2-dimethoethane, and its oligomers, i.e., the glymes.

Other embodiments are within the following claims.

What is claimed is:

1. A rechargeable electrochemical cell comprising a lithium-containing electrode and an electrolyte, said electrolyte consisting of
   a lithium salt,
   a solvent for said lithium salt consisting of a polymethoxy ether selected from dimethoxyethane and trimethoxymethane, and
   an organic cosolvent comprising between 0 and 95% of said electrolyte, by volume,
   said polymethoxy ether being present in said electrolyte in an amount sufficient to render the cycling efficiency of said electrolyte greater than said cycling efficiency of an electrolyte consisting of said lithium salt and said cosolvent.

2. The cell of claim 1 wherein said polymethoxy ether is dimethoxyethane.

3. The cell of claim 1 wherein said polymethoxy ether is trimethoxymethane.

4. The cell of claim 1 wherein said lithium salt is LiAsF$_6$.

5. The cell of claim 1 wherein said electrolyte contains a mixture of dimethoxymethane and trimethoxymethane.

6. The cell of claim 1 wherein said electrolyte consists of said lithium salt and at least 50% by volume, of said polymethoxy ether.

7. The cell of claim 1 wherein said electrolyte consists of said lithium salt and at least 90%, by volume, of said polymethoxy ether.

8. The cell of claim 1 wherein said electrolyte is essentially free of solvents other than polmethoxy ether.

9. The cell of claim 1 wherein said cosolvent is an ether.

* * * * *